D. Chase,
Water Wheel.
No. 96,775. Patented Nov. 16, 1869.
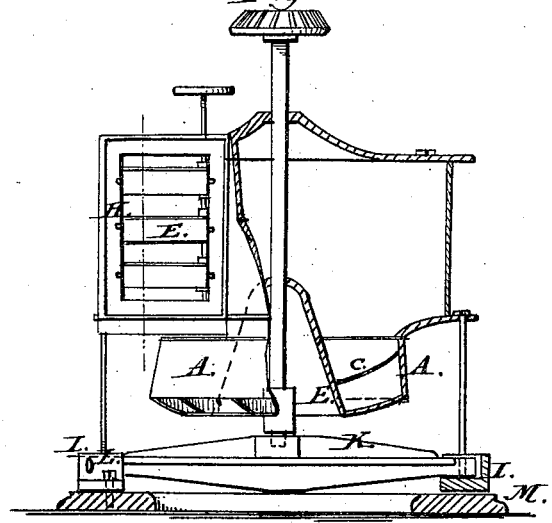
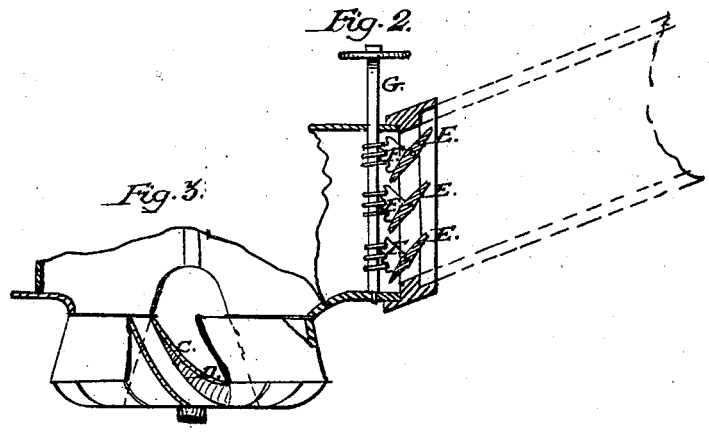
Witnesses:
Jno. E. P. Brooks
Geo. W. Mabie
Inventor:
D. Chase
by
Munn & Co.
attorneys

DENISON CHASE, OF ORANGE, MASSACHUSETTS.

Letters Patent No. 96,775, dated November 16, 1869.

IMPROVEMENT IN WATER-WHEELS.

The Schedule referred to in these Letters Patent and making part of the same.

*To all whom it may concern:*

Be it known that I, DENISON CHASE, of Orange, in the county of Franklin, and State of Massachusetts, have invented a new and useful Improvement in Water-Wheels; and I do hereby declare that the following is a full, clear, and exact description thereof, which will enable others skilled in the art to make and use the same, reference being had to the accompanying drawing, forming part of this specification.

This invention relates to improvements in water-wheels, of that class where the water strikes the upper part of the buckets, to impart a direct impulsion thereto, and is then so changed in its action, by the form of the buckets, as to have a reacting effect on being discharged.

The invention consists in an improved form of the buckets and of the bottom of the wheel, calculated to facilitate the discharge of the water, and to obtain a greater percentage of power by the said discharge.

The invention also comprises an improved arrangement of the gate, and the supports and adjusting-devices of the bridge-tree, which improvements are also applicable to other wheels.

Figure 1 represents an elevation of my improved wheel, partly sectioned.

Figure 2 represents a section, taken on the line $x$ $x$ of fig. 1.

Figure 3 represents a view of one of the buckets, the outer rim being broken out.

Similar letters of reference indicate corresponding parts.

A represents the outer rim of the wheel;

B, the inner one; and

C represents the buckets.

These buckets represent, at the top, nearly radial lines, and from the top they curve downward to the bottom, the said curves representing nearly quarter circles.

Hitherto, wheels have been made in this way, with the outer and inner rims on vertical lines, or nearly so, and both extending downward the same distance.

My present invention consists in inclining these rims toward each other, or the inner one toward the outer one, to make the space considerably narrower at the bottom; also, in extending the inner wall B below the outer one, and curving the outer edge of the buckets upward, as shown in fig. 3, whereby a course is given to the water more in accordance with that to which it is inclined by the action of the centrifugal force to which it is subject after first striking the wheel.

When the outer rim extends as low as the inner one, it obstructs the discharge of the water to a considerable extent, which my arrangement obviates.

The contraction of the space toward the bottom, facilitates the reactive force of the water, and the curvature of the buckets, as shown at D, adapts them to be more powerfully acted upon by the water when discharging more in the direction of the centrifugal force, as above stated.

My improvement in the arrangement of the gate consists in the employment of two or more valves, E, oscillating on trunnions in the frame F, and arranged to swing the tops away from, and the bottoms toward the wheel, so that the passages between them, as also the passages between them and the walls of the chute will, whether partly or wholly opened, be more nearly in the line of the direction the water is required to take in moving along to the wheel.

These valves are provided with toothed segments F, and gear with worm-gears on a vertical shaft, G, for opening or closing them.

Instead of the shaft G, a sliding toothed rack may be used.

As very nearly or quite the same effect would be attained in directing the water toward the outside of the scroll, which is drawn at H, these valves would answer a good purpose if arranged vertically instead of horizontally, and with their inner edges to swing away from the said side of the scroll, and I contemplate, in some cases, making this arrangement.

The improvement in the bridge-tree supporting and adjusting-apparatus consists in making the chairs I, wherein the ends of the bridge-tree rest, detachable from the base M, so that by removing them from under the ends of the said bridge-tree, the latter will fall down sufficiently to be disengaged from the spindle in the end of the shaft, to permit of the renewal of the spindle, when required, or of the steps wherein it works.

The vertical walls of the chairs and the ends of the bridge-tree are rounded, and the latter may thereby be adjusted either laterally or lengthwise by the employment of only two set-screws, L, at each end, instead of three, as heretofore used.

Having thus described my invention,

What I claim as new, and desire to secure by Letters Patent, is—

1. In combination with the buckets C, arranged at their upper edges in a nearly radial line, and thence curving downward, the rims A and B, of unequal length, set at an inclination to the shaft and also to each other, substantially as herein shown and described, and for the purpose specified.

2. The valves E, arranged to be operated substantially as shown and described, for the purpose of regulating the flow of water.

3. The chairs I, having circular cavities for the reception of the rounded ends of the bridge-tree K, whereby the latter may be adjusted both laterally and longitudinally, by means of but two set-screws L, and detachably connected to the base M, to permit the lowering of the bridge-tree, as described and shown.

The above specification of my invention signed by me, this 11th day of May, 1869.

Witnesses:          DENISON CHASE.
  FRANK BLOCKLEY,
  C. L. TOPLIFF.